United States Patent Office 3,134,893
Patented May 26, 1964

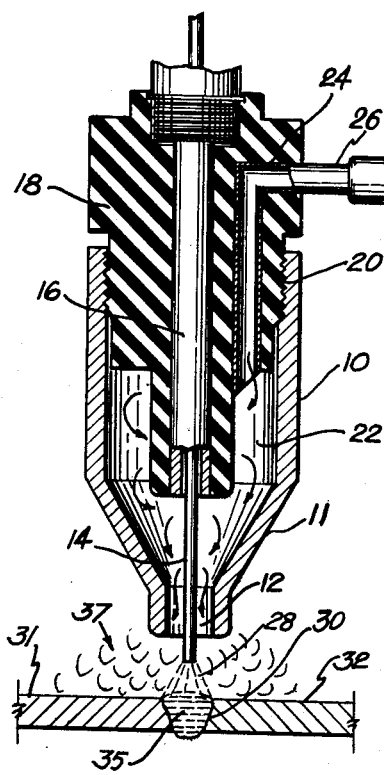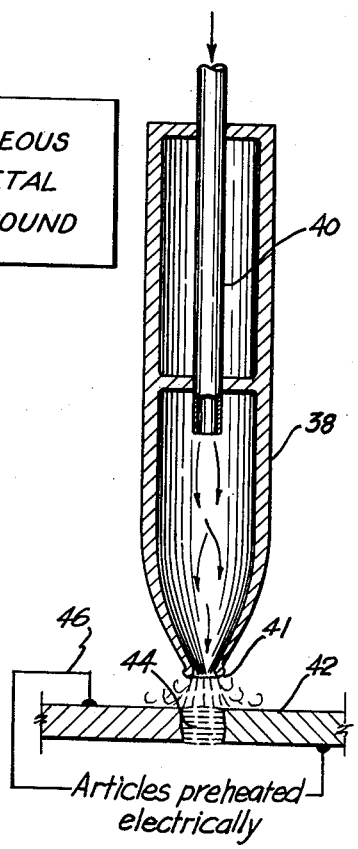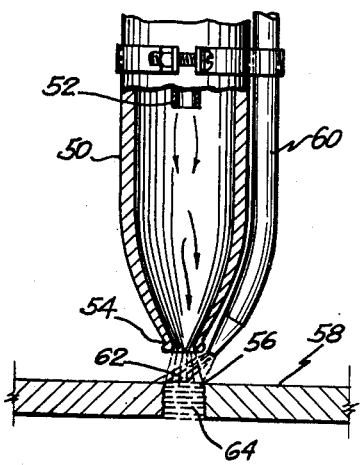

3,134,893
APPARATUS FOR WELDING
Harry A. Toulmin, Jr., Dayton, Ohio, assignor to The Commonwealth Engineering Company of Ohio, Dayton, Ohio
Filed Nov. 3, 1960, Ser. No. 67,053
2 Claims. (Cl. 219—74)

The present invention relates to a method and apparatus for welding, and more particularly to the welding of parts using a thermally decomposable metal bearing compound for supplying the metal.

Briefly the process comprises carrying out the welding by heating the part or parts to be welded to a temperature high enough to cause a gaseous metal compound, such as metal carbonyl, to decompose and deposit the metal in the weld cavity and weld the parts together. In such a process, the gaseous metal compound serves both as a shield as well as a metal supplying element.

The welding process of the invention makes it possible to produce satisfactory welds without the need of using fluxes or the like. Further, the process is useful for welding parts together, the parts being disposed in any position, for instance horizontal, vertical or overhead.

In the preferred embodiment of the invention, the same will be described in more detail with respect to the use of metal carbonyls as the thermally decomposable metal bearing compounds. It will, of course, be understood that the welding process of the invention may be practiced employing other and equivalent heat-decomposable metal bearing compounds.

The accompanying drawings illustrate preferred embodiments of the apparatus and method of welding utilizing the invention.

In the drawings:

FIGURE 1 is an elevation view in section of a welding apparatus of the shielded-arc electrode type, the apparatus and parts being welded being shown in vertical section;

FIGURE 2 is a similar elevation view in vertical section and illustrating a modification of the welding apparatus of FIGURE 1, and wherein the electrode is omitted; and FIGURE 3 is a fragmentary detail view of the welding apparatus illustrated in FIGURE 2 wherein the parts to be welded is heated by a torch or flame disposed adjacent the nozzle and through which the vapors of a heat-decomposable metal bearing gas is directed in carrying out the welding operation.

Referring to the several figures, the shielded-arc welding apparatus shown in FIGURE 1 comprises a tubular casing 10 having an integral conical section 11 defining a nozzle opening 12. A fusible electrode 14 which may be a metal wire is arranged centrally of the casing 10, being slidably retained in a sleeve 16 fixedly positioned in an electrically insulating body 18. The latter is suitably threaded into the upper part of the casing 10 as shown at 20.

The electrode 14 extends out through the nozzle opening 12, the latter being of larger diameter than the electrode to allow for the passage of a gaseous metal bearing compound which is admitted to the chamber 22 of the casing 10. A conduit or pipe 24 is disposed in the insulating body 18 and communicates with the chamber 22, the pipe 24 being connected with an inlet pipe 26 which in turn communicates with a source of gaseous metal carbonyl or the like metal bearing compound.

An electric arc 28 is formed between the end of the electrode and the weld area 30 as defined by the members 31 and 32 being welded. Suitable means, not shown, may be employed to advance the electrode to the work to initiate the arc and regress the electrode the requisite distance from the work to maintain the arc during welding. The current supplied to the electrode is of sufficient intensity to bring about melting of the end of the electrode whereby metal is transferred in the form of molten metal to the weld area 30. Molten metal forms a puddle or globular mass 35 which fills the weld area.

During the welding operation, a gaseous metal bearing compound, such as nickel carbonyl is admitted to the chamber 22 and flows out around the lower end of the arrows and forms a gaseous shield or cloud about the electric arc weld as illustrated at 37. The gaseous metal carbonyl in contact with the heated weld area decomposes depositing metal over the weld area which functions as a metal flux to assist in producing a tenaceous adherent weld uniting the workpieces. The outermost portion of the cloud of gaseous metal carbonyl shields the arc and confines the welding metal to the area being welded.

Employing the electric arc welding arrangement shown in FIGURE 1, the consumable metal electrode 16 may be composed of a suitable metal or alloy, e.g., aluminum, copper, magnesium, titanium, nickel, iron, carbon steel, stainless steels and the like alloys. The electrode preferably is in the form of a wire of the metal which is fed toward the work. For most purposes, the rate of feeding the electrode is on the order of 90 to 100 or more inches per minute depending upon the electrode and welding conditions imposed. Either direct or alternating current may be employed and a self-adjusting arc can be used as commonly employed in electric arc welding systems of this character.

The voltage across the welding arc generally is in the neighborhood of 20 to 30 volts when using an average length arc. An open circuit voltage is generally about three times the voltage across the arc.

The welding process of the invention permits one to select the heat-decomposable metal compound such that the metal of the compound is compatible with the metal of the electrode. In this way a tough, tenaceous weld can be produced, and which may be made to closely approach that of the workpiece being welded. Welding with or without an electrode, in accordance with this invention, the metal supplied by the heat-decomposable compound may be selected which will unite or alloy with the metal of the workpiece to form a strong adherent weld. The invention thus provides a gas plated weld.

Where less metal is required to effect the weld, a modification such as illustrated in FIGURE 2 may be used. In the modification shown, the electrode is omitted and hollow casing 38 is arranged to receive the tubular conduit 40, through which gaseous metal carbonyl or the like thermally decomposable metal bearing compound is introduced as indicated by the arrows in FIGURE 2. The gaseous metal compound flows out the nozzle end 41 of the casing 38 and in contact with the workpiece 42 at the weld area 44.

To heat the work area 44 the workpiece 42 is electrically heated as indicated at 46. In operation the weld area of the workpiece is heated to a temperature such as to cause the metal bearing compound to be thermally decomposed and metal deposited in the weld area 44 thus integrally uniting the workpieces.

In the modified welding apparatus shown in FIGURE 3 the same comprises a hollow casing 50 and inlet conduit 52 for introducing gaseous metal carbonyl or the like heat-decomposable metal compound, which is discharged from the nozzle end 54 into the weld area 56 of the workpiece 58. In this modification heat is supplied by a blow torch means 60 which is suitably clamped to the casing 50 as by the adjustable strap 62. The lower end of the blow torch means 60 is curved to conform generally with the nozzle end 54 of the casing. In this way the blow torch flame 62 is made to intersect with the metal bearing gases flowing from the nozzle end of the casing whereby the heat of the flame decomposes the metal bearing gas to cause metal to be deposited in the weld area 64 and weld the workpiece.

When using metal carbonyls such as nickel, or chromium carbonyl as the metal bearing compound the temperature of the workpiece may be on the order of 400° F. On the other hand to deposit a weld of aluminum metal using aluminum alkyls a temperature of 550° F. is preferably used.

The invention thus provides a welding apparatus and method of welding which can be utilized with or without an electrode, and with or without the use of electric current. The invention accordingly has much greater utility and usefulness than conventional welding apparatus.

Further, while the invention is disclosed and described in connection with the use of certain thermally decomposable metal bearing compounds, it will be obvious to those skilled in the art that other compounds of different metals, both organo-metallic and inorganic may be substituted for the typical heat-decomposable metal compounds hereinbefore mentioned.

It will be further understood that this invention may be modified in order to adapt the same to different usages and conditions and it is accordingly desired to comprehend such modifications within the present invention and as may come within the scope of the claims appended hereto.

What is claimed is:

1. An apparatus for welding workpieces of the metal arc welding type and which comprises a casing defining a chamber, an outlet opening in such casing communicating with said chamber, a wire metal electrode slidably arranged in said casing and extending outward through said outlet opening and toward the workpiece to be welded, said electrode being connected to a source of electrical energy whereby an electrical arc is produced between the outer end of said electrode and said workpiece during welding, and means including a conduit connected to said casing and communicating with said chamber introducing a gaseous heat-decomposable metal compound thereinto and which is discharged through said outlet and about the arc end of said electrode, said metal electrode being electrically insulated from said casing and from the conduit through which said gaseous heat-decomposable metal compound is introduced.

2. A welding apparatus as set forth in claim 1, wherein the gaseous metal compound is nickel carbonyl and the workpiece is a ferrous metal.

References Cited in the file of this patent
UNITED STATES PATENTS

| | | |
|---|---|---|
| 2,049,575 | Sutton | Aug. 4, 1936 |
| 2,211,448 | Vaughn et al. | Aug. 13, 1940 |
| 2,249,723 | Orr | July 15, 1941 |
| 2,277,654 | Merlub-Sobel et al. | Mar. 24, 1942 |
| 2,475,601 | Fink | July 12, 1949 |
| 2,602,033 | Lander | July 1, 1952 |
| 2,698,812 | Schladitz | Jan. 4, 1955 |
| 2,824,948 | Van Der Willigen et al. | Feb. 25, 1958 |
| 2,881,094 | Hoover | Apr. 7, 1959 |
| 2,898,234 | Nack et al. | Aug. 4, 1959 |
| 2,934,820 | Novak et al. | May 3, 1960 |
| 2,948,803 | Wilson et al. | Aug. 9, 1960 |